United States Patent Office 3,798,194
Patented Mar. 19, 1974

3,798,194
PREPARATION OF LATEXES BY DIRECT DISPERSION OF ACIDIC ORGANIC POLYMERS INTO AQUEOUS ALKALINE MEDIA CONTAINING CERTAIN ALKANOLS
Gordon D. McCann and Earl T. Dumitru, Midland, Mich., assignors to The Dow Chemical Company, Midland, Mich.
No Drawing. Filed Oct. 7, 1968, Ser. No. 765,622
Int. Cl. C08f 47/16
U.S. Cl. 260—29.6 E    10 Claims

ABSTRACT OF THE DISCLOSURE

Synthetic latexes and aqueous colloidal dispersions, free of added external surfactants and emulsifiers, are made from normally solid, water- and alkali-insoluble thermoplastic organic addition polymers containing a plurality but low concentration of carboxylic acid groups in the polymer structure and which are in non-colloidal massive form by digesting the polymer in admixture with an enveloping alkaline aqueous liquid medium containing an alkanol such as n-butanol, n-pentanol, or mixtures thereof until the polymer spontaneously converts into colloidal particles in the aqueous medium. In examples, a solid thermoplastic copolymer of ethylene and 8% by weight acrylic acid, in the form of molding granules, was converted to latex form by digestion in aqueous ammonia containing n-butanol. The resulting dispersions are useful in impregnating, coating and adhesive compositions.

RELATED APPLICATIONS

The subject matter of this application is related to that of a copending application of Gordon D. McCann, Earl T. Dumitru, and James B. Louch, Ser. No. 741,903, filed July 2, 1968, now abandoned, for "Preparation of Latexes by Direct Dispersion of Acidic Organic Polymers Into Aqueous Alkaline Media."

BACKGROUND OF THE INVENTION

This invention relates to a method for making synthetic latxes from organic polymers in massive form, more particularly from addition polymers containing carboxylic acid groups in their molecular structure.

Various synthetic organic polymers such as polymers of ethylene, of styrene, of acrylic esters, and of vinyl esters are known to be useful as, and in the preparation of, adhesives, coatings, laminations and the like. While they can be applied in many ways, it is often desirable to apply such polymers in the form of aqueous colloidal dispersions of the kind commonly called latexes. However, many polymers are made by polymerizing a monomer system en masse, or in non-aqueous solvent, or in non-colloidal suspension in a fluid suspending medium. Consequently, the art desiring an aqueous latex form of these polymers has resorted to making colloidal dispersions of the mass polymers in aqueous media using water-soluble surfactants and emulsifiers such as soap, etc., with or without the aid of organic solvents that are subsequently removed, using various colloid mills, homogenizers and the like. Although such resulting latexes may have some utility, the presence therein of the water-soluble surfactants and emulsifiers is sometimes disadvantageous in that such materials are generally incompatible with the dispersed polymer and interfere with the formation of coherent coatings. Moreover, these residual water-soluble or hydrophilic materials have a deleterious effect on the strength, toughness and water sensitivity of the dried film or coating and usually impair the adhesive bond between the polymer layer and an adjacent surface.

In the aforementioned copending and related patent application, there is described an improved method wherein synthetic latexes and aqueous colloidal dispersions, free of added external surfactants and emulsifiers, are made from normally solid, water- and alkali-insoluble thermoplastic organic addition polymers containing a plurality of carboxylic acid groups in the polymer structure and which are in non-colloidal massive form by digesting the polymer in admixture with an enveloping alkaline aqueous liquid medium until the polymer spontaneously converts into colloidal particles in the aqueous medium. In an example, a solid thermoplastic ternary copolymer of ethylene, 11.2% by weight ethyl acrylate, and 11% by weight acrylic acid, in the form of molding granules, was converted to latex form by digestion in aqueous ammonia or in aqueous potassium hydroxide. The resulting dispersions are useful in impregnating, coating and adhesive compositons.

However, in some instances, the composition of an acidic polymer starting material is such that the concentration of carboxylic acid groups in the polymer structure is so low that spontaneous dispersion thereof into colloidal particles in the aqueous medium is slow, incomplete, or does not take place.

SUMMARY OF THE INVENTION

In accordance with the present invention, certain synthetic organic polymers in massive form, which are addition polymers containing a plurality of carboxylic acid groups in their molecular structure but wherein the concentration of such acid groups is low so that the polymers are not readily dispersible as described in the aforementioned copending and related patent application, are converted easily into aqueous colloidal dispersions, i.e. aqueous latex form.

In general and as more particularly described hereinafter, the present invention is a further improved method for making aqueous colloidal dispersions from organic addition polymers containing a plurality but low concentration of carboxylic acid groups in the polymeric molecular structure thereof carried out by digesting non-colloidal masses of the polymers with alkaline aqueous liquid media which also contain certain alkanols as the continuous enveloping phase whereby the polymer masses spontaneously convert into collidal particles in the aqueous media. The presence of the specified kind of alkanols results in the dispersion of polymers which are not spontaneously dispersible in wholly aqueous media. The resulting latex products are emulsifier free and can be used advantageously as such or with the subsequent further addition of surfactants or other agents of kinds and amounts desired by the artisan for his particular purpose.

DETAILED DESCRIPTION AND EMBODIMENTS

In accordance with this invention, normally solid, water- and alkali-insoluble thermoplastic organic addition polymers containing a plurality but low concentration of carboxylic acid groups in the polymeric structure thereof are converted from non-colloidal massive forms into synthetic latexes and aqueous colloidal dispersions without the use of emulsifiers by digesting a non-colloidal mass of the polymer in admixture with a continuous enveloping phase of alkaline aqueous liquid medium (preferably an amount thereof at least equal to the amount of polymer, on a volume basis), the alkaline medium containing a base at least as basic as ammonia, such as ammonia, organic amines, and alkali metal hydroxides, and also containing at least one alkanol having water-solubility characteristic of the group n-butanol, n-pentanol, and mixtures thereof, by heating the admixture until the polymer mass spontaneously converts to colloidal particles in the aqueous medium.

The polymers contemplated for use in accordance with this invention and illustrated in the examples that follow are organic addition polymers characterized in general in being materials that are normally solid (i.e. per se solid at normal room temperature), normally insoluble in water and in aqueous alkali (i.e. substantially insoluble both in the acid form and in neutral salt form in liquid water at normal room temperature in the absence of mutual solvents), and thermoplastic (i.e. capable of being reversibly softened by heat and hardened by cooling and moldable at temperatures below their decomposition temperature). The macromolecules of the addition polymer can be of any chemical structure provided that the massive material has the general physical properties just mentioned and further provided that the molecular structure contains a plurality of carboxylic acid groups. By "acid group" is meant a group capable of neutralization by aqueous alkali to form a water-ionizable carboxylate salt, including the carboxy ($-CO_2H$) and the carboxylic acid anhydride groups which react with aqueous alkali to form water ionizable salt groups. The bulk of the polymeric macromolecular structure to which the acid group is attached can be of any chemical structure provided (as stated above) the material has the required general physical properties and is chemically stable to conditions of treatment with aqueous alkali whereby the acid groups are neutralized. It will be understood that the requirement that the polymer be thermoplastic precludes any extensive degree of covalent bond cross-linking in the polymer molecular structure, although the macromolecular chains may otherwise be linear, or branched, or lightly cross-linked or associated by intermolecular forces such as by crystallization, hydrogen bonding, or ionic linkages.

It will be understood that the occurrence of acid groups in the dispersible polymer should be general through the macromolecules thereof. That is to say, only those macromolecules which contain a substantial number of active acid groups can be expected to respond to the action of the aqueous base to make a colloidal dispersion in accordance with this invention. It is not necessary that all macromolecules in a given mass of polymer contain the same number of, or proportion of, acid groups, and in some instances the process effects a separation of dispersible material from non-dispersible material.

As indicated hereinbefore, the improvement provided by the present invention in the use of n-butanol or n-pentanol or mixtures or equivalents thereof in the aqueous alkaline digestion medium is particularly advantageous in respect to the defined polymers containing a low concentration of carboxylic acid groups in the macromolecular structure. In general, polymers having an average of less than about 1.53 milliequivalents (meq.) of acid groups per gram of polymer are very difficult to disperse spontaneously in alkaline aqueous media and those having an average of less than about 1.12 meq. of carboxylic acid groups per gram of polymer are not dispersible by the method of the aforementioned patent application. In contrast thereto, by the further improvement provided by the present invention, polymers having an average of less than about 1.53 meq. down to about 0.49 meq. of carboxylic acid groups per gram of polymer are spontaneously dispersible in aqueous alkaline digestion media by the aid of n-butanol, n-pentanol, or mixtures thereof. In the case of ethylene-acrylic acid binary copolymers, this means that copolymers having less than 1.11 down to about 3.5 weight percent acrylic acid are dispersible by this technique. Of course, polymers of the defined kind having average of more than 1.53 meq. of carboxylic acid groups per gram of polymer are also dispersible in the alkanol-containing media of this invention, but such polymers can usually be dispersed in the wholly aqueous media of the aforementioned copending patent application whereas, as indicated, those having less than 1.53 meq. of carboxylic acid groups per gram of polymer are difficult if not impossible to disperse in wholly aqueous media in accordance with that method.

As indicated hereinbefore, the starting normally solid water-insoluble thermoplastic organic acid addition polymers can be of any chemical structure provided that they have the physical properties and acid characteristics described. Typical acid polymers are addition polymers of ethylenically unsaturated monomers where the starting monomers include one having an acid group of the kind specified. For example, suitable polymers are the random copolymer products of copolymerization of mixtures of one or more polymerizable ethylenically unsaturated carboxylic acids such as acrylic acid, methacrylic acid, maleic acid and anhydride, itaconic acid, fumaric acid, citraconic acid and anhydride, methyl hydrogen maleate, and the like, and one or more non-acid polymerizable monomers, such as ethylene, propylene, butene-1, 1,3-butadiene, and other aliphatic olefins; styrene, α-methylstyrene, vinyltoluene, chlorostyrene, and other aromatic olefins; ethyl acrylate, methyl methacrylate, vinyl acetate and other unsaturated esters; vinyl and vinylidene chloride; vinyl ethers, acrylamide; acrylonitrile; and the like. Particularly suitable copolymers include:

(1) Copolymers of ethylene and from about 3.5 to about 11% by weight of one or more ethylenically unsaturated acids such as acrylic acid, methacrylic acid, methyl hydrogen maleate, etc. as above recited;

(2) Copolymers of ethylene, from about 3.5 to about 11% by weight of one or more ethylenically unsaturated acids, and up to about 20% by weight of one or more other monomers such as ethyl acrylate, vinyl acetate, etc., as above recited;

(3) Copolymers of styrene (and/or other ar-vinylaromatic compounds) and from about 3.5 to about 11% by weight of one or more ethylenically unsaturated acids such acrylic acid, maleic anhydride, etc., as above recited.

Other polymers are made from preformed and nonacid polymers by subsequent chemical reaction carried out thereon. For example, the carboxylic acid group may be supplied by providing carboxylic anhydride, ester, amide, acyl halide, and nitrile groups which are then hydrolyzed to carboxylic acid groups.

Specific examples and illustrations of representative organic acid copolymers, given for purposes of illuminating the description and not to limit the scope of the invention are:

Ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate (ternary) copolymers, ethylene/acrylic acid/ethyl acrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/acrylic acid/vinyl acetate copolymers, ethylene/methacrylic acid/vinyl acetate copolymers, ethylene/acrylic acid/vinyl alcohol copolymers, ethylene/propylene/acrylic acid copolymers, ethylene/acrylamide/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, styrene/acrylic acid copolymers, styrene/methacrylic acid copolymers, styrene/itaconic acid copolymers, styrene/methyl methacrylate/acrylic acid copolymers, styrene/maleic anhydride copolymers, styrene/citraconic anhydride copolymers, ar-chlorostyrene/acrylic acid copolymers, ar-t-butylstyrene/acrylic acid copolymers, methyl methacrylate/isobutyl acrylate/acrylic acid copolymers.

Specific procedures and means for making polymers are known to the art and do not constitute the essence of the present invention. While particular polymers are used in the description of the invention for purposes of illustrating the same, it will be understood that other polymers may be used. The suitability of any polymer for the present purposes can be readily ascertained by a few preliminary tests following the present description; this is particularly advantageous when the starting polymeric material is of unknown composition or history and it is not possible to ascertain its exact chemical structure.

The process of this invention is carried out by digesting a non-colloidal mass of the polymer with an alkaline aqueous liquid medium containing an alkanol having water-solubility characteristic of n-butanol, n-pentanol, or mixtures thereof as a continuous enveloping phase. The non-colloidal mass usually comprises the common granular form of moldable resin materials but can be any form of chip, bit or piece of material resulting from chopping or grinding, or molded bead, pill, pellet or other piece.

The base in the alkaline aqueous medium used in making the dispersion is any base which in water solution is at least as basic as ammonia, e.g. any of the alkali metal hydroxides such as lithium hydroxide, sodium hydroxide, potassium hydroxide, rubidium hydroxide and cesium hydroxide, and the nitrogenous bases such as ammonium hydroxide and water-soluble strong base organic amines such as mono-, di-, and tri-methylamine, -ethylamine, -isopropylamine, and -isobutylamine, cyclohexylamine, etc., which form ionizable salts with the acid groups in the polymer, tetramethylammonium hydroxide, and the like, and mixtures of such bases.

The concentration of the alkali base in the aqueous medium is a function of the concentration of the acid group in the starting polymer and the amount of such polymer to be dispersed in the aqueous medium. Usually the amount of alkali corresponds to at least 0.2 equivalent per acid group in the polymer, preferably from about 0.5 to about 1 equivalent of alkali per equivalent of acid group in the polymer when the alkali is an alkali metal hydroxide, larger amounts being preferred when weaker bases are used. When the polymer is dispersed in ammonium hydroxide in a vessel having a substantial vapor space above the liquid level, as in a conventional kettle, the amount of the ammonia charged is greater, e.g. from 5 to 10, sometimes in the order of 20 or more equivalents per acid group, to obtain rapid dispersion. In some instances, a very high proportionate amount of ammonia may reduce the minimum temperature necessary to effect dispersion. It appears that ammonia and volatile amines tend to volatilize from the liquid phase and concentrate in the vapor space, especially at high temperatures; in any event, more is required in the charge at higher temperatures in order to be effective in the aqueous medium containing the solid polymer. When the starting acid polymer contains a carboxylic acid anhydride as the acid group, such group is counted as two equivalents of acid group for purpose of computing the number of equivalents of base required for neutralization.

In general, the amount of alkanol having the water-solubility characteristics of n-butanol, n-pentanol, or mixture thereof in the aqueous alkaline medium is in the range from about 3 to about 20, preferably from about 4 to about 15, percent by weight of the alkanol based on the aqueous medium. In terms of the polymer to be dispersed the specified alkanol is in proportion of from about 0.2 to about 1, preferably from about 0.3 to about 0.5, part of alkanol per part of polymyer, by weight.

The amount of aqueous medium (containing the specified alkanol) relative to the amount of starting polymer is selected so that the aqueous liquid medium surrounds and envelops the polymeric particles, and so that the resulting latex product has the desired concentration of polymeric material. Usually, the amount of aqueous medium is at least equal in volume to the starting polymer and may be as much larger as desired to make more dilute latexes. Generally, from about 1 to about 20 parts by weight of aqueous medium is charged per part by weight of starting polymer, preferably so that the polymer is from about 5 to about 33⅓ percent by weight of the combined polymer and aqueous medium, i.e. about 2–19 parts of aqueous medium per part of polymer solids by weight. Of course, a concentrated latex product can be subsequently diluted and a dilute latex product can be subsequently concentrated by known means.

The digestion step is carried out by simply holding together the starting polymer and aqueous alkanol-containing alkaline liquid medium, conveniently in a vessel such as a kettle adapted for holding the contents in the solid/liquid state under autogenous pressure when volatile bases and/or higher temperatures are used. The digestion can also be carried out in an elongated pipeline vessel, it being necessary only to provide good contact and exposure of the polymer pieces to the enveloping aqueous alkanolic alkaline liquid medium and to provide heat as necessary or desired. It is not necessary to use vigorous agitation or particle reduction of the nature provided by colloid mills and homogenizers. In fact, spontaneous dispersion and peptization is obtained in static experiments. Hence agitation is not a required feature, but merely an aid to promote speedier conversion and better heat transfer. The digestion process is accelerated by heat. Usually temperatures of about 90° C. and above are employed. Faster latex conversions are usually obtained with higher temperatures up to about 140–160° C., provided the polymers are thermally stable up to such temperatures. Still higher temperatures, e.g. to about 180° C. and up to the decomposition temperature, can be used, but without significant advantage. In some instances, lower temperatures can be used but longer times may be required.

The resulting digestion mixture consists of, or comprises, a latex-like colloidal dispersion of the polymer as submicronic particles in the aqueous medium. In some instances a portion of the starting polymer material may remain undispersed, or may have aglomerated by fusing together, but such non-colloidal material is readily separated, e.g. by settling and decantation or by filtering from the latex product.

The latex products so provided consist essentially of the polymer, water, alkanol, and alkali, the polymer being dispersed as colloidal particles in the order of 200–5000, more usually from 500 to 1000, angstrom units, the latexes having pH of 7 and above, generally from about 8 to about 11. The concentration of polymer in the latex usually is in the order of from about 5 to about 30 percent by weight. Because they are free of external emulsifiers, latexes are obtainable by this process which are relatively low foaming, i.e. they form little foam on vigorous shaking or stirring, and the foam that does form readily collapses on quiet standing. They are also very stable in that they do not readily coagulate on stirring or on the addition of moderate amounts of ionic or non-ionic water-soluble solutes which do not lower the pH below the neutral point. Latexes of carboxylic acid polymers are coagulated by acidification, unless they are stabilized by added emulsifiers that are functional in acid media.

The resulting latex products are useful as, and in the preparation of, material for coating, impregnating, and treating substrates, for adhesives in the making of laminates, in the formulation of paint and ink compositions, and for casting of film. Other materials can be admixed with the latexes such as pigment, inert fillers, colorants, other polymer latexes, and reagents reactive with the acid polymers; water soluble surfactants can also be added if desired.

Other characteristics, features and details of the process of the present invention and the latex products thereof are shown in the following examples which illustrate the invention but are not to be taken as limiting the same. Unless otherwise indicated, parts, percentages, and ratios are by weight. All of the polymers used in these examples were normally solid, water- and alkali-insoluble thermoplastic polymer resins made by conventional means known in the art.

Where, in the examples, a "melt flow value" of the polymer is given, this melt flow value is a measure of the flow properties, of the thermoplastic material as obtained in the apparatus and by the general procedure described in the ASTM method designation D1238–65T (Condition E).

EXAMPLE 1

The polymer used in this example was a random copolymer of ethylene and acrylic acid containg 8% acrylic acid and having a melt flow value of 5 grams per 10 minutes, in the form of molding granules.

Into a pressure vessel was placed 400 grams of the above copolymer, 170 grams n-butanol, and 1430 grams 10.3% aqueous ammonium hydroxide, resulting in a mixture containing 10.6% n-butanol based on the aqueous medium and n-butanol/polymer ratio of 0.425. The resulting mixture was heated to and held at 122° C. with agitation for 70 minutes, then cooled to room temperature during 85 minutes. The resulting product was a viscous colloidal latex containing about 20% polymer solids.

EXAMPLE 2

Two hundred grams of the copolymer described in Example 1 was stirred in a pressure vessel with 50 grams n-butanol and 800 grams 10.3% aqueous ammonium hydroxide (5.9% n-butanol based on aqueous medium; n-butanol/polymer ratio of 0.25) for 30 minutes at 80° C., 15 minutes at 90° C., and 75 minutes at 125° C. At that time a portion of the starting granules remained together with a low viscosity latex. After a further 14.75 hours at 125° C. the starting granules had disintegrated and dispersed into a low viscosity latex containing a few visible macroscopic particles.

When 70 grams of n-butanol was used instead of the above 50 grams (i.e. 8.1% based on aqueous medium and n-butanol/polymer ratio of 0.35), the granules were transformed completely to a white emulsion of low viscosity that was still fluid and of low viscosity after standing for seven days. The latex contained about 18.7% polymer solids.

It might be mentioned that no latex product or dispersion was obtained when 200 grams of the polymer granules was heated with agitation in an aqueous medium of 85 grams n-propanol and 715 grams 10.3% aqueous ammonium hydroxide. It appears that n-propanol, which is completely miscible with water, is not equivalent to n-butanol for the purposes of this invention.

EXAMPLE 3

Latex of higher polymer solids concentration was made by digesting 300 grams of the copolymer described in Example 1 in 90 grams n-butanol and 700 grams 10.3% aqueous ammonium hydroxide (11.4% n-butanol in aqueous medium; n-butanol/polymer ratio 0.30) for 30 minutes at 80° C., 15 minutes at 90° C., and 75 minutes at 125° C., forming a viscous latex. After cooling, the resulting product was a creamy dispersion containing small chunks of the starting granules.

When this test was repeated using 120 grams (instead of 90 grams) of n-butanol (14.6% n-butanol in aqueous medium; n-butanol/polymer ratio of 0.4), the granules disintegrated and dispersed to form a white, viscous latex containing about 26.8% polymer solids.

EXAMPLE 4

A copolymer of the kind described in Example 1 but in the form of a 200–500 mesh powder was used. One hundred grams thereof was digested with 35 grams n-butanol and 865 grams of 10.3% aqueous ammonium hydroxide (3.9% n-butanol in aqueous medium; n-butanol/polymer ratio of 0.35) by heating to 120° C. forming a fluid latex. On cooling, the viscosity increased somewhat. The polymer solids content of the resulting latex was about 10%.

EXAMPLE 5

In this test there was used a random copolymer of ethylene and acrylic acid containing 5.8% acrylic acid and having melt flow value of 33.9 grams per 10 minutes, in the form of molding granules.

One hundred grams of such copolymer granules was digested in 40 grams n-butanol and 860 grams 10.3% aqueous ammonium hydroxide (4.4% n-butanol in aqueous medium; n-butanol/polymer ratio of 0.4) for 60 minutes at 80°, 60 minutes at 90°, and 30 minutes at 125° C. When the temperature reached 100° C. (as it was rising from 90° toward 125° C.), the granules turned white, swelled within a few minutes, and began to disintegrate and disperse into the form of a latex emulsion of low viscosity. The resulting product was a fluid latex containing about 10% polymer solids.

EXAMPLE 6

In this test there was used a random copolymer of ethylene and acrylic acid containing 3.5% acrylic acid and having melt flow value of 12 grams per 10 minutes, in the form of molding granules.

One hundred grams of such copolymer granules was digested in 40 grams n-butanol and 860 grams 10.3% ammonium hydroxide (4.4% n-butanol in aqueous medium; n-butanol/polymer ratio of 0.4) for 60 minutes at 80°, 60 minutes at 90° and 16 hours at 125° C. The granules partially disintegrated and dispersed to form a latex also containing non-colloidal material.

EXAMPLE 7

Two hundred grams of granules of the copolymer described in Example 1 was digested in a mixture of 109 grams n-pentanol and 691 grams of 10.3% aqueous ammonium hydroxide (13.6% n-pentanol in the aqueous medium; n-pentanol/polymer ratio of 0.545) for 30 minutes at 80°, 30 minutes at 100°, and 2 hours at 120° C., resulting in complete conversion of the granules to a white latex having low viscosity and containing about 20% polymer solids.

In a further test, 300 grams of granules of the same copolymer was digested in a mixture of 109 grams n-pentanol and 591 grams 10.3% aqueous ammonium hydroxide (15.6% n-pentanol based on aqueous medium; n-pentanol/polymer ratio of 0.363) for 30 minutes at 80° and 30 minutes at 100°. The temperature was then raised to 120° C.; after a few minutes at 120° C., the granules were transformed completely to a viscous fluid latex containing about 30% polymer solids.

Mixtures of n-butanol and n-pentanol in all proportions are used in place of n-butanol and n-pentanol in the foregoing examples with substantially the same results.

EXAMPLE 8

One hundred grams of granules of a random copolymer of 92% ethylene and 8% methyl acid maleate was digested in a mixture of 40 grams n-butanol and 860 grams 10.3% aqueous ammonium hydroxide (4.4% n-butanol in the aqueous medium; n-butanol/polymer ratio of 0.4) for 30 minutes at 80° and 4 hours at 125° C. Most of the polymer dispersed to form a fluid latex which was readily filtered from a small amount of undispersed granule fragments and non-colloidal matter.

In like manner as hereinbefore described, aqueous colloidal dispersions are made from other normally solid, water- and alkali-insoluble thermoplastic polymers containing carboxylic acid groups in the polymer structure by digesting small non-colloidal pieces thereof in aqueous alkaline media containing any one or mixture of alkanols having water-solubility characteristic of n-butanol, n-pentanol, and mixtures thereof as an enveloping phase.

The latexes and aqueous colloidal dispersions so prepared are useful in various ways evident to the artisan. They are particularly useful in treating, coating or impregnating fibrous and porous substrates and materials, such as paper, felts, cloth and other fabrics, wood and the like, by dipping, brushing, rolling, spraying, padding or other means, usually followed by drying and perhaps by heating. For example, paper coated or impregnated with one of the latex products made as described above, dried and heated on hot rolls or in an oven, is thereby strengthened and rendered more resistant to abrasion and to oils and solvents. In some instances a layer or coating or dried residue from a latex on paper or other substrates imparts heat seal properties thereto.

Latexes made as above described by digestion aqueous media media containing the specified alkanol and volatile bases such as ammonia or volatile amines loose water, alkanol, and volatile base on drying a thin film or layer. The resulting residue tends to revert to the acid form of the starting polymer. For example the ammoniacal latex of digestion of an ethylene/acrylic acid copolymer in aqueous media containing the specified alkanol and ammonia, when dried as a thin layer, loses water, alkanol, and ammonia and deposits a dried film of the ethyelne/acrylic acid copolymer. The resulting ethylene/acrylic acid copolymer layer is highly adherent to many substrates such as paper, glass, metal, and many plastics, and in turn accepts, with formation of strong bond thereto, superimposed layers of other coating materials, plastics, diverse laminae, ink, etc. Articles coated in this manner with ethylene/acrylic acid copolymer are advantageously resistant to moisture, gasoline, oil and greases.

What is claimed is:

1. In a method for making aqueous colloidal dispersions from normally solid, water- and alkali-insoluble thermoplastic organic addition polymers containing at least about 0.49 milliequivalent of carboxylic acid groups per gram of polymer in the polymeric molecular structure thereof and which are in non-colloidal massive form, said carboxylic acid groups being capable of neutralization by aqueous alkali to form water-ionizable salt groups, the improvement which comprises digesting a non-colloidal mass of the polymer in admixture with at least an equal volume of a continuous and enveloping phase of alkaline aqueous liquid medium containing from about 3 to about 20 percent by weight based on the medium of an alkanol selected from the group consisting of n-butanol, n-pentanol, and mixtures thereof and containing a base at least as basic as ammonia in amount of at least 0.2 equivalent of base per acid group in the polymer whereby the polymer spontaneously converts into colloidal particles in the aqueous medium.

2. The improvement of claim 1 wherein the enveloping alkaline aqueous liquid medium is an aqueous solution comprising ammonium hydroxide.

3. The improvement of claim 2 wherein the enveloping alkaline aqueous liquid medium is an aqueous solution comprising n-butanol.

4. The improvement of claim 2 wherein the enveloping alkaline aqueous liquid medium is an aqueous solution comprising n-pentanol.

5. The improvement of claim 1 wherein the polymer is a copolymer of ethylene and from about 3.5 to about 11% by weight of ethylenically unsaturated carboxylic acid.

6. The improvement of claim 5 carried out by digesting one part by weight of the polymer in from about 2 to about 19 parts by weight of aqueous ammonium hydroxide solution containing from about 0.2 to about 1 part by weight of the specified alkanol per part by weight of the polymer.

7. The improvement of claim 6 wherein the polymer is a binary copolymer of ethylene and acrylic acid.

8. The improvement of claim 6 wherein the polymer is a ternary copolymer of ethylene, up to about 20 percent by weight of ethyl acrylate, and from about 3.5 to about 11 percent by weight of acrylic acid.

9. The improvement of claim 6 wherein the polymer is a binary copolymer of ethylene and methyl hydrogen maleate.

10. In a method for making aqueous colloidal dispersions from normally solid, water- and alkali-insoluble thermoplastic organic addition polymers containing in the molecular structure thereof from about 0.49 to about 1.53 milliequivalents of carboxylic acid groups per gram of polymer and which are in non-colloidal massive form, said carboxylic acid groups being capable of neutralization by aqueous alkali to form water-ionizable carboxylate salt groups, said polymers being selected from the group consisting of ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/acrylic acid/ethyl acrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/acrylic acid/vinyl acetate copolymers, ethylene/methacrylic acid/vinyl acetate copolymers, ethylene/acrylic acid/vinyl alcohol copolymers, ethylene/propylene/acrylic acid copolymers, ethylene/acrylamide/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, styrene/acrylic acid copolymers, styrene/methacrylic acid copolymers, styrene/itaconic acid copolymers, styrene/methyl methacrylate/acrylic acid copolymers, styrene/maleic anhydride copolymers, styrene/citraconic anhydride copolymers, ar-chlorostyrene/acrylic acid copolymers, ar-t-butylstyrene/acrylic acid copolymers, and methyl methacrylate/isobutyl acrylate/acrylic acid copolymers; the improvement according to claim 1 wherein said method consists essentially of digesting a non-colloidal mass consisting essentially of said polymer in admixture with at least an equal volume of a continuous and enveloping phase of alkaline aqueous liquid medium in proportion in the range of from about 1 part by weight of the polymer in from about 2 to about 19 parts by weight of the aqueous medium, said medium containing from about 3 to about 20 percent by weight based on the medium of an alkanol selected from the group consisting of n-butanol, n-pentanol, and mixtures thereof and containing a base selected from the group consisting of the alkali metal hydroxides, ammonium hydroxide, mono-, di-, and tri-methylamine, -ethylamine, -isopropylamine, and -isobutylamine, cyclohexylamine, tetramethylammonium hydroxide, and mixtures of said bases, in an amount of from about 0.2 to about 20 equivalents of base per acid group in the polymer whereby the polymer spontaneously converts into a dispersion of colloidal particles in the aqueous medium, the dispersion having from about 5 to about 30 percent by weight of polymer solids.

References Cited
UNITED STATES PATENTS

| | | | |
|---|---|---|---|
| 2,538,273 | 1/1951 | Rhines | 260—29.6 PT UX |
| 2,963,452 | 12/1960 | Sinn | 260—29.7 EM UX |
| 3,232,899 | 2/1966 | Guziak | 260—29.6 PM UX |
| 3,364,164 | 1/1968 | Lyons | 260—29.6 E |
| 3,296,172 | 1/1967 | Funck et al. | 260—29.6 TA |
| 3,389,109 | 6/1968 | Harmon et al. | 260—29.6 E |

ROBERT F. WHITE, Primary Examiner

J. B. LOWE, Assistant Examiner

U.S. Cl. X.R.

260—29.6 N, 29.6 TA